(12) United States Patent
Peng

(10) Patent No.: US 11,614,110 B2
(45) Date of Patent: Mar. 28, 2023

(54) DEMOUNTABLE ASSEMBLY STRUCTURE

(71) Applicant: GETAC TECHNOLOGY CORPORATION, Hsinchu County (TW)

(72) Inventor: Cheng-Shih Peng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 601 days.

(21) Appl. No.: 16/212,614

(22) Filed: Dec. 6, 2018

(65) Prior Publication Data

US 2020/0182277 A1    Jun. 11, 2020

(51) Int. Cl.
*F16B 2/22* (2006.01)

(52) U.S. Cl.
CPC ............ *F16B 2/22* (2013.01); *Y10T 403/591* (2015.01)

(58) Field of Classification Search
CPC ...... F16B 2/22; F16B 2/243; Y10T 403/1616; Y10T 403/1624; Y10T 403/551; Y10T 403/59; Y10T 403/591; Y10T 403/599; Y10T 403/60; Y10T 403/602; Y10T 403/66; Y10T 403/7092; Y10T 292/0809; Y10T 292/0813; Y10T 292/0814; Y10T 292/0816; Y10T 292/0817; Y10T 292/082; Y10T 292/0821; Y10T 292/0876; Y10T 292/0877; Y10T 292/0878; Y10T 292/088; Y10T 292/438; Y10T 24/45613; Y10T 24/45618; H01R 13/6272; H01R 13/6273; B65D 2251/1058; E05C 17/52; E05C 19/00; E05C 19/06; E05C 19/066

USPC .................................................. 439/374, 929
See application file for complete search history.

(56) References Cited

U.S. PATENT DOCUMENTS

| | | | | |
|---|---|---|---|---|
| 4,050,003 A | * | 9/1977 | Owings | B25F 3/00 439/481 |
| 5,327,619 A | * | 7/1994 | Ortega | A44B 11/266 24/616 |
| 5,465,191 A | * | 11/1995 | Nomura | E05C 1/10 292/145 |
| 5,744,934 A | * | 4/1998 | Wu | H01R 13/6675 307/150 |
| 5,931,513 A | * | 8/1999 | Conti | E05C 19/066 292/87 |

(Continued)

*Primary Examiner* — Amber R Anderson
*Assistant Examiner* — Kevin J Baynes

(57) ABSTRACT

A demountable assembly structure includes a first body, second body, and engaging component. The first body has a first sliding surface and a slide switch recess positioned proximate to the first sliding surface. The second body has a second sliding surface and an engaging channel positioned proximate to the second sliding surface. The engaging channel is opposite the slide switch recess. The engaging component has a slide switch and a resilient element. The resilient element has a basal portion fixedly disposed in the slide switch recess and a resilient engaging arm extended from the basal portion to the engaging channel and engaged inside the engaging channel. The resilient engaging arm has a guide surface opposite the engaging channel. When the first sliding surface slides onto the second sliding surface, the resilient engaging arm gets engaged inside the engaging channel by having the guide surface slid along the engaging channel.

20 Claims, 7 Drawing Sheets

(56) References Cited

U.S. PATENT DOCUMENTS

| | | | | |
|---|---|---|---|---|
| 5,935,729 | A * | 8/1999 | Mareno | H01M 50/213 429/100 |
| 6,051,334 | A * | 4/2000 | Tsurumaru | H01M 50/20 429/97 |
| 6,517,129 | B1 * | 2/2003 | Chien | E05B 63/248 292/121 |
| 6,660,427 | B1 * | 12/2003 | Hukill | H04M 1/0262 429/97 |
| 6,829,495 | B2 * | 12/2004 | Lee | H04M 1/0262 455/575.1 |
| 6,918,781 | B2 * | 7/2005 | Annecke | H01R 13/6273 439/350 |
| 6,988,903 | B1 * | 1/2006 | Cheng | H01R 31/065 439/137 |
| 7,264,492 | B2 * | 9/2007 | Liang | H01R 24/28 439/151 |
| 7,300,297 | B1 * | 11/2007 | Wang | H01R 27/00 439/173 |
| 7,458,489 | B1 * | 12/2008 | Mudd | A45F 5/02 224/197 |
| 7,621,765 | B1 * | 11/2009 | Wu | H01R 27/00 439/173 |
| 7,796,396 | B2 * | 9/2010 | Hanson | E05C 1/10 361/726 |
| 7,879,479 | B2 * | 2/2011 | Roehm | B25F 5/02 429/97 |
| 8,033,518 | B2 * | 10/2011 | Schuchman | B60N 3/103 248/311.2 |
| 8,214,000 | B2 * | 7/2012 | Hwang | H04M 1/0262 455/575.1 |
| 8,322,760 | B2 * | 12/2012 | Wu | E05B 65/006 292/163 |
| 8,448,308 | B2 * | 5/2013 | Mountz | A44B 11/2511 24/631 |
| 8,505,986 | B2 * | 8/2013 | Sun | H01M 50/20 292/80 |
| 8,587,396 | B2 * | 11/2013 | Liang | G06F 1/1633 335/205 |
| 9,257,767 | B2 * | 2/2016 | Lewis | H01R 13/506 |
| 9,722,377 | B1 * | 8/2017 | Cheng | H01R 31/065 |
| 9,740,243 | B2 * | 8/2017 | Urimoto | H01M 50/209 |
| 9,917,404 | B1 * | 3/2018 | Kuo | H01R 13/506 |
| 10,158,105 | B2 * | 12/2018 | Jenkins | B25F 5/02 |
| 2002/0160255 | A1 * | 10/2002 | Babcock | H01M 50/209 429/97 |
| 2003/0096527 | A1 * | 5/2003 | Greiner | H01R 13/6272 439/352 |
| 2006/0105617 | A1 * | 5/2006 | Padro | H01R 13/6275 439/484 |

* cited by examiner

DEMOUNTABLE ASSEMBLY STRUCTURE

BACKGROUND OF THE INVENTION

Field of the Invention

The present disclosure relates to match structures and, more particularly, to a demountable assembly structure for joining peripheral parts.

Description of the Prior Art

Conventional match structures, such as a mortise and tenon joint, are for use in joining two objects in a separable manner. To perform alignment during an assembly process, other conventional match structures, such as a rail, enables the two objects to be precisely aligned and joined, and then the two objects are fixed together with the mortise and tenon joint. To separate the two objects, either the mortise and tenon are disengaged, or the user employs a fastener or any other interference structure.

However, the prior art has two drawbacks. First, the mortise and tenon can be disengaged so easily that assembly-related structural strength is inadequate. Second, increasing the structural strength of the mortise and tenon joint overly in an attempt to overcome the aforesaid drawback renders disassembly difficult. The aforesaid two drawbacks together pose a dilemma.

The inventor of the present disclosure considers it important to overcome the aforesaid drawbacks of the prior art and thus puts forth the present disclosure.

SUMMARY OF THE INVENTION

An objective of the present disclosure is to provide a demountable assembly structure for joining and separating two objects quickly and conveniently, so as to enhance ease of use.

In order to achieve the above and other objectives, an embodiment of the present disclosure provides a demountable assembly structure including a first body, a second body, and an engaging component. The first body has a first sliding surface and a slide switch recess positioned proximate to the first sliding surface. The second body has a second sliding surface slidable relative to the first sliding surface and an engaging channel positioned proximate to the second sliding surface. The engaging channel is opposite the slide switch recess. The engaging component includes a slide switch and a resilient element. The resilient element has a basal portion fixedly disposed in the slide switch recess and at least one resilient engaging arm extended from the basal portion to the engaging channel and engaged inside the engaging channel. Through the resilient element, the slide switch is disposed in the slide switch recess movably in a direction of force toward the engaging channel, and the slide switch triggers the at least one resilient engaging arm to disengage from the engaging channel as soon as the slide switch undergoes a backward push in the direction of force.

In order to achieve the above and other objectives, an embodiment of the present disclosure provides a demountable assembly structure including a first body, a second body, and an engaging component. The first body has a first sliding surface and a slide switch recess positioned proximate to the first sliding surface. The second body has a second sliding surface slidable relative to the first sliding surface and an engaging channel positioned proximate to the second sliding surface. The engaging channel is opposite the slide switch recess. The engaging component includes a slide switch and a resilient element. The resilient element has a basal portion fixedly disposed in the slide switch recess and at least one resilient engaging arm extended from the basal portion to the engaging channel and engaged inside the engaging channel. The at least one resilient engaging arm has a guide surface opposite the engaging channel. The at least one resilient engaging arm gets engaged inside the engaging channel by having the guide surface slid along the engaging channel as soon as the first sliding surface slides onto the second sliding surface.

In order to achieve the above and other objectives, an embodiment of the present disclosure provides a demountable assembly structure including a first body, a second body, and an engaging component. The first body has a first sliding surface and a slide switch recess positioned proximate to first sliding surface. The second body has a second sliding surface slidable relative to the first sliding surface and an engaging channel positioned proximate to the second sliding surface. The engaging channel is opposite the slide switch recess. The engaging component includes a slide switch and a resilient element. The resilient element has a basal portion fixedly disposed in the slide switch recess and at least one resilient engaging arm extended from the basal portion to the engaging channel and engaged inside the engaging channel. The at least one resilient engaging arm has a guide surface opposite the engaging channel. Through the resilient element, the slide switch is disposed in the slide switch recess movably in a direction of force toward the engaging channel. To join the first body and the second body, the first sliding surface slides onto the second sliding surface such that the at least one resilient engaging arm gets engaged inside the engaging channel by having the guide surface slid along the engaging channel. To separate the first body and the second body, the slide switch undergoes a backward push in the direction of force such that the slide switch triggers the at least one resilient engaging arm to disengage from the engaging channel.

DETAILED DESCRIPTION OF THE EMBODIMENTS

To enable persons skilled in the art to gain insight into features and technical contents of the present disclosure, the present disclosure is depicted with drawings and described in detail below. However, the accompanying drawings are illustrative of the present disclosure rather than restrictive of the present disclosure.

Figure 1:
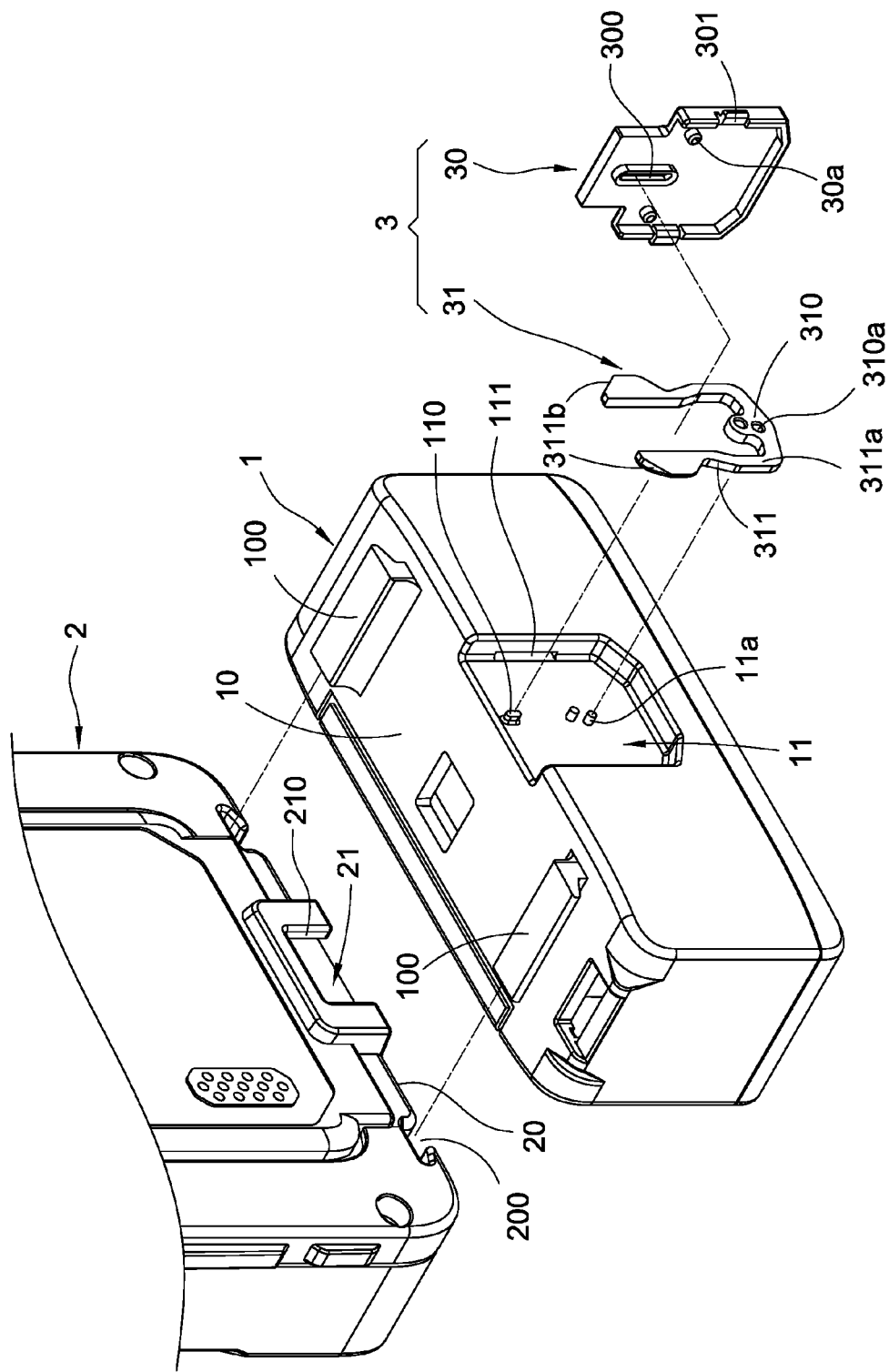
FIG. 1 is a partial exploded view of a demountable assembly structure according to an embodiment of the present disclosure.

Referring to FIG. 1, there is shown a partial exploded view of a demountable assembly structure according to an embodiment of the present disclosure. An embodiment of the present disclosure provides a demountable assembly structure for coupling together two objects and separating the two objects, allowing the two objects to be quickly joined as needed and quickly separated when not needed, so as to enhance ease of use. The demountable assembly structure includes a first body 1, a second body 2, and an engaging component 3. The first and second bodies 1, 2 are any two objects which have to be coupled together and separated. In an embodiment of the present disclosure, the first and second bodies 1, 2 are an electronic device and a backup battery which can be engaged with each other. The first body 1 is the electronic device. The second body 2 is the backup battery. The first and second bodies 1, 2 match structurally and can be joined and separated quickly when operating in conjunction with the engaging component 3, so as to manifest ease of use. In a variant embodiment of the present disclosure, the electronic device is a portable image pickup device, for example, a hidden recorder mounted on a hat or clothing, a body-worn camera, a portable evidence collection camcorder, and a mini camera, but the present disclosure is not limited thereto.

The first body 1 has a first sliding surface 10 and a slide switch recess 11 positioned proximate to the first sliding surface 10. The slide switch recess 11 is disposed on a surface adjacent to the first sliding surface 10. The slide switch recess 11 is hollowed out to be flush against the first sliding surface 10. The second body 2 has a second sliding surface 20 slidable relative to the first sliding surface 10 and an engaging channel 21 positioned proximate to the second sliding surface 20. The engaging channel 21 is opposite the slide switch recess 11. The engaging channel 21 is disposed on a surface adjacent to the second sliding surface 20. After the first sliding surface 10 of the first body 1 has slid relative to the second sliding surface 20 of the second body 2, the engaging channel 21 corresponds in position to both the slide switch recess 11 and the first sliding surface 10.

Figure 2:
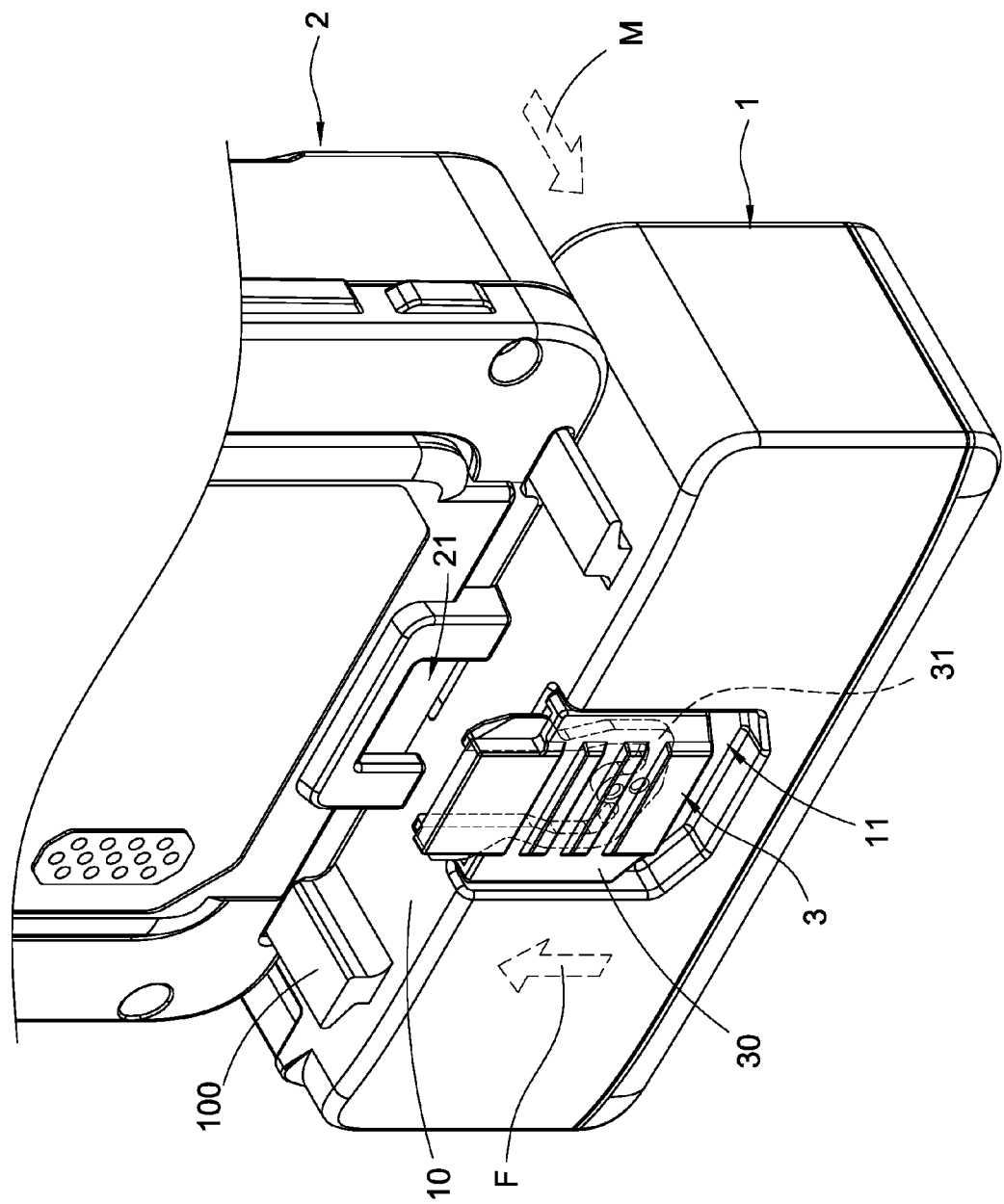
FIG. 2 is a perspective view of first and second bodies joined according to an embodiment of the present disclosure.

Referring to FIG. 2, in an embodiment of the present disclosure, a rail 100 is disposed on the first sliding surface 10 of the first body 1, whereas a groove 200 which matches the rail 100 is disposed on the second sliding surface 20 of the second body 2. The rail 100 and the groove 200 match; hence, the first and second sliding surfaces 10, 20 of the first and second bodies 1, 2 each undergo a lateral movement M, thereby joining the first and second bodies 1, 2. However, the rail 100 and the groove 200 may swap their positions, but the present disclosure is not limited thereto. According to the present disclosure, the engaging component 3 ensures the stability of the first and second bodies 1, 2 joined, prevents the first and second bodies 1, 2 joined from separating easily, and allows the first and second bodies 1, 2 to be joined or separated quickly and conveniently.

Referring to FIG. 1, the engaging component 3 includes a slide switch 30 and a resilient element 31. The resilient element 31 has a basal portion 310 fixedly disposed in the slide switch recess 11. The basal portion 310 is extended to the engaging channel 21 and engaged with at least one resilient engaging arm 311 in the engaging channel 21. Through the resilient element 31, the slide switch 30 is disposed in the slide switch recess 11 movably in a direction of force F toward the engaging channel 21. In an embodiment of the present disclosure, at least one limit protrusion 30a of the slide switch 30 abuts against the at least one resilient engaging arm 311, and thus the at least one resilient engaging arm 311 allows the slide switch 30 to abut against the slide switch recess 11 in the direction of force F. A limit recess 300 and a bump 110 are disposed between the slide switch 30 and the slide switch recess 11 and correspond in position to each other. The limit recess 300 is extended in the direction of force F and disposed on the slide switch 30. The bump 110 is disposed in the slide switch recess 11. If the slide switch 30 is disposed on the slide switch recess 11, the bump 110 can be disposed in the limit recess 300, and the slide switch 30 must be disposed in the slide switch recess 11 movably in the direction of force F. The bump 110 and the limit recess 300 may swap their positions, but the present disclosure is not limited thereto.

A guide protrusion 301 is disposed on each of the two sides of the slide switch 30. Two slide slots 111 corresponding in position to the two guide protrusions 301, respectively, are disposed in the slide switch recess 11. With the two slide slots 111 being also extended in the direction of force F, the slide switch 30 is also disposed in the slide switch recess 11 movably in the direction of force F. Likewise, the slide slots 111 and the two guide protrusions 301 may swap their positions, but the present disclosure is not limited thereto.

Figure 3:
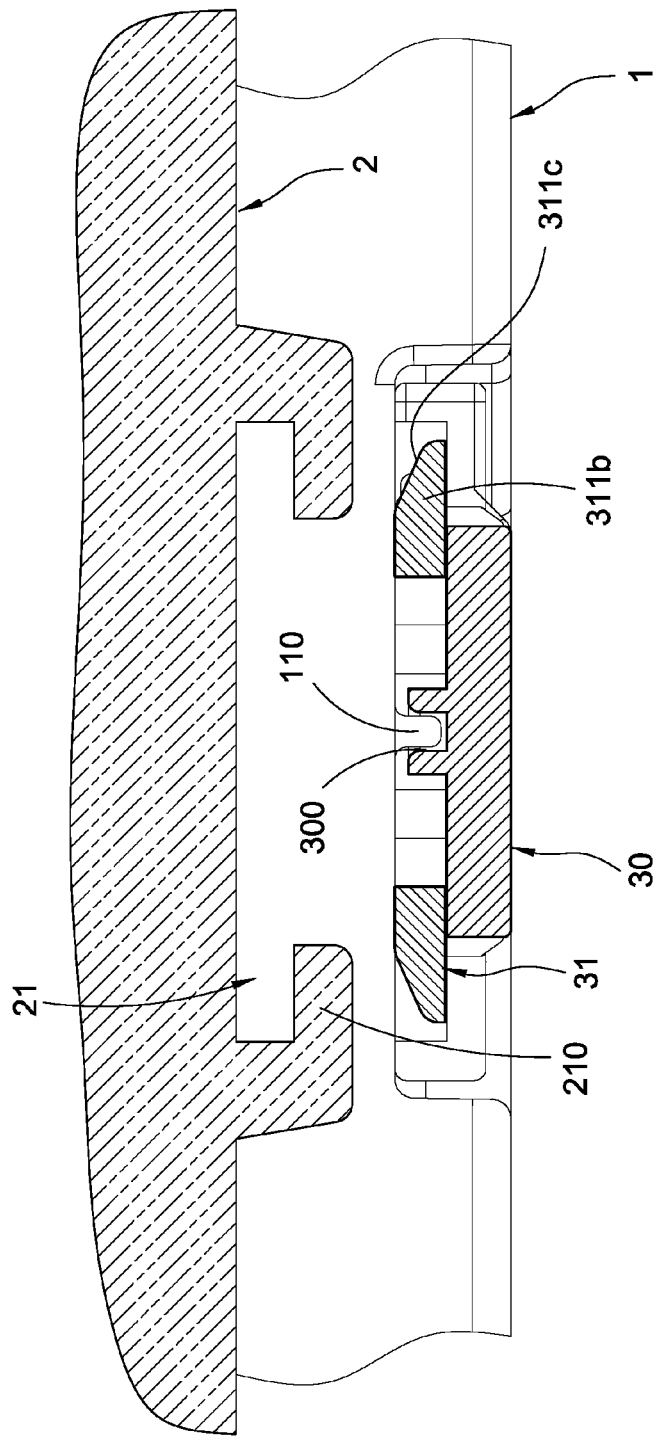
FIG. 3 is a cross-sectional view of the first and second bodies before being joined according to an embodiment of the present disclosure.

The at least one resilient engaging arm 311 has a resilient portion 311a extended from the basal portion 310 and an engaging portion 311b formed at the end of the resilient portion 311a. As shown in FIG. 3, the at least one resilient engaging arm 311 further has a guide surface 311c opposite the engaging channel 21. The guide surface 311c lies on the engaging portion 311b of the at least one resilient engaging arm 311. The guide surface 311c tapers outward.

Figure 4:
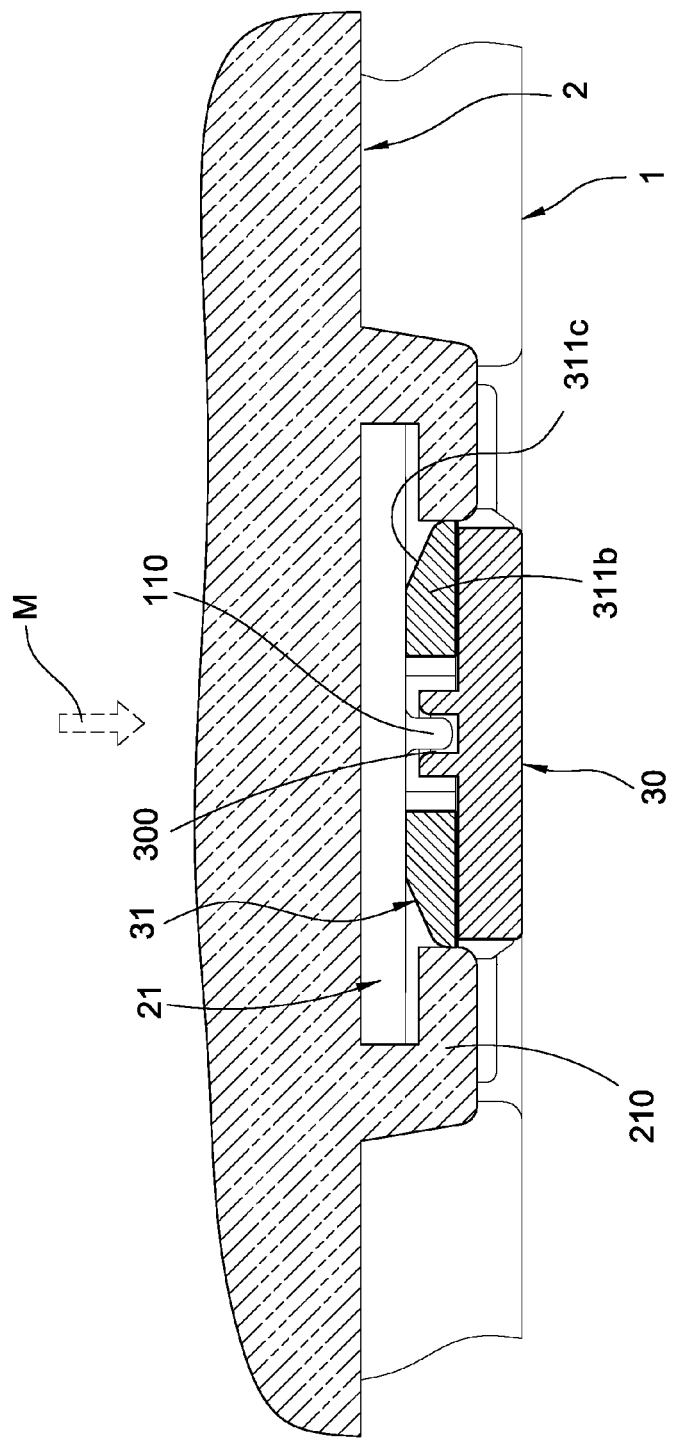
FIG. 4 is a cross-sectional view of the first and second bodies being joined according to an embodiment of the present disclosure.
Figure 5:
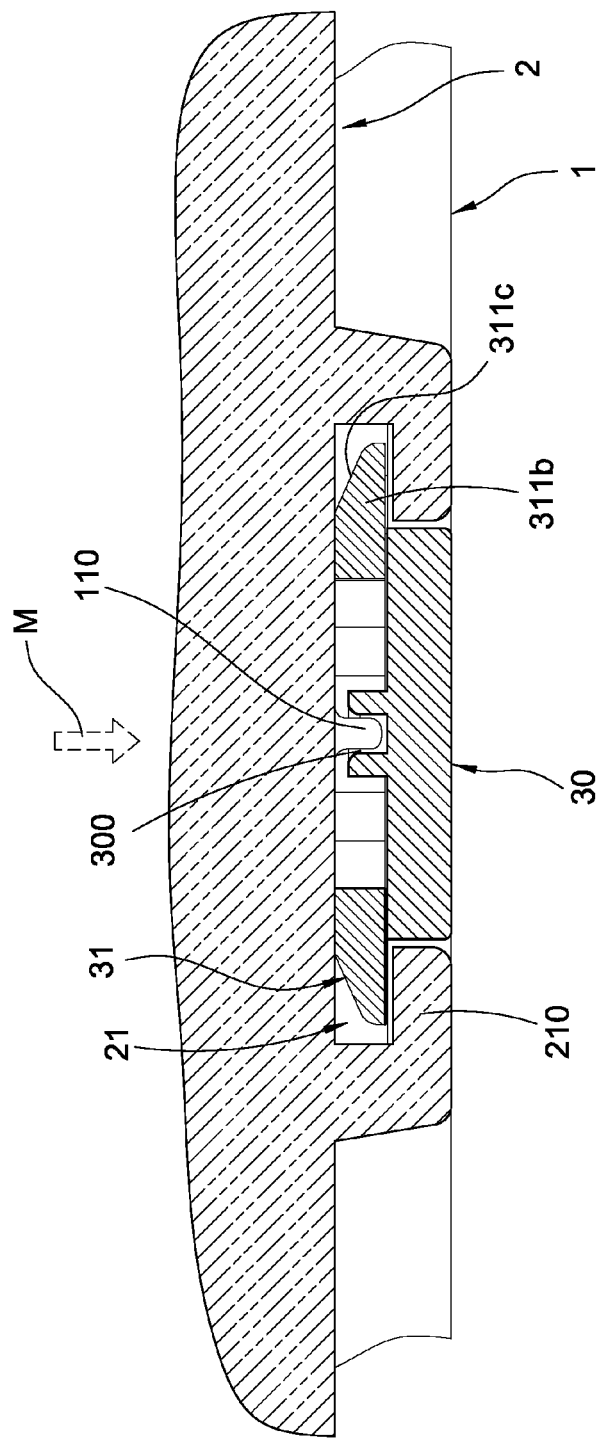
FIG. 5 is a cross-sectional view of the first and second bodies joined according to an embodiment of the present disclosure.
Figure 6:
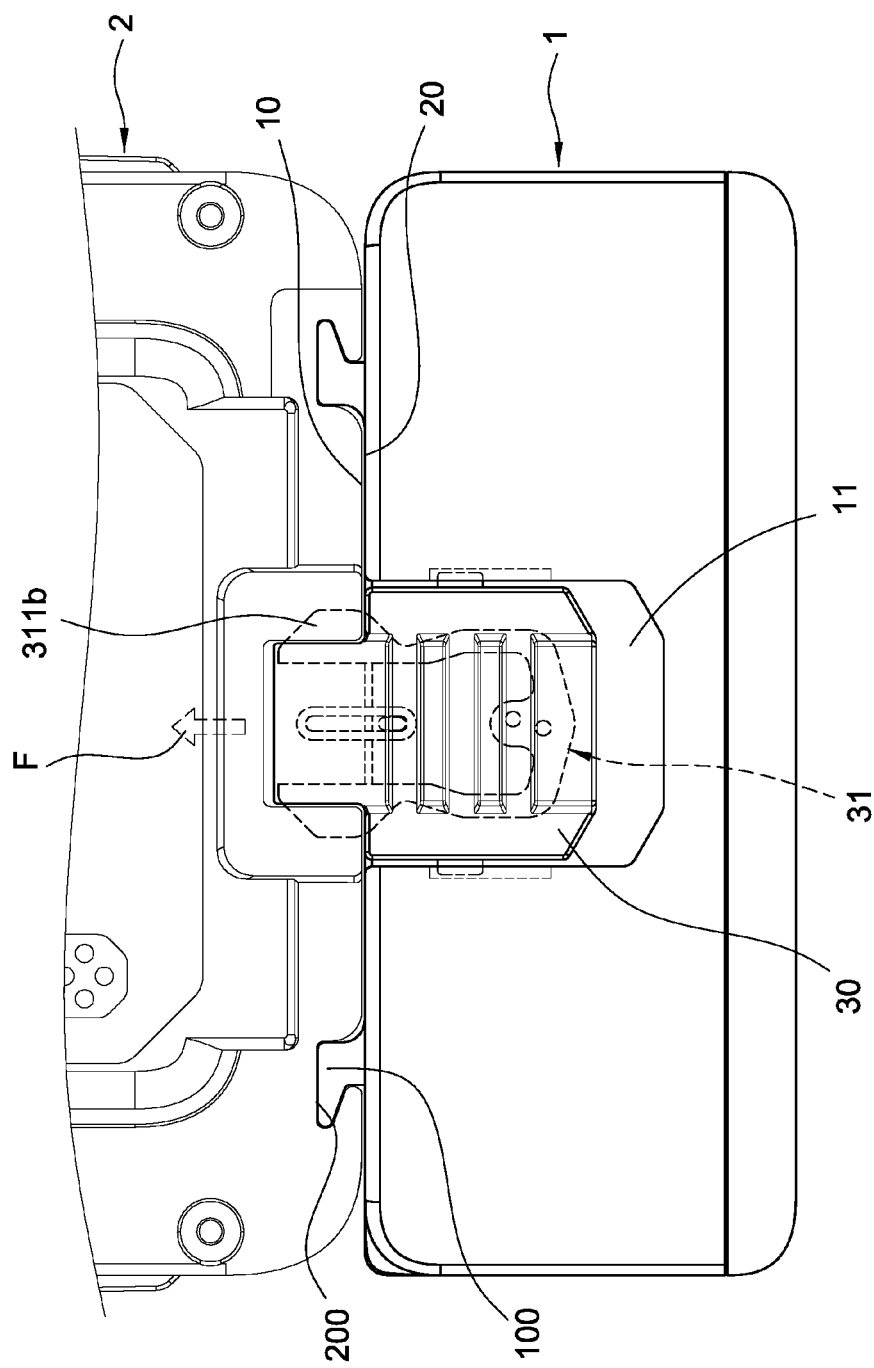
FIG. 6 is a schematic view of the first and second bodies joined according to an embodiment of the present disclosure.

Therefore, given the aforesaid technical features, the demountable assembly structure in an embodiment of the present disclosure is implemented As shown in FIG. 3, FIG. 4 and FIG. 5, as soon as the first and second bodies 1, 2 are joined by sliding the first sliding surface 10 onto the second sliding surface 20 (in the lateral movement M), the guide surface 311c of the at least one resilient engaging arm 311 (the engaging portion 311b) comes into contact with the outer edge of the engaging channel 21 (as shown in FIG. 3), and the guide surface 311c comes into contact with the outer edge of the engaging channel 21. Hence, the at least one resilient engaging arm 311 retracts because of the resilient portion 311a (as shown in FIG. 4), allowing the engaging portion 311b to be engaged inside the engaging channel 21 (as shown in FIG. 5). An engaging protrusion 210 corresponding in position to the engaging portion 311b is disposed in the engaging channel 21. The engaging portion 311b is engaged inside the engaging protrusion 210 of the engaging channel 21 (as shown in FIG. 5). Therefore, as shown in FIG. 6, the first and second bodies 1, 2 undergo the lateral movement M to meet positioning-related needs, such as quick assembly and engagement. Therefore, a user only needs to manually push the first and second bodies 1, 2 toward each other in the direction of the lateral movement M in order to join the first and second bodies 1, 2 quickly and easily.

Figure 7:
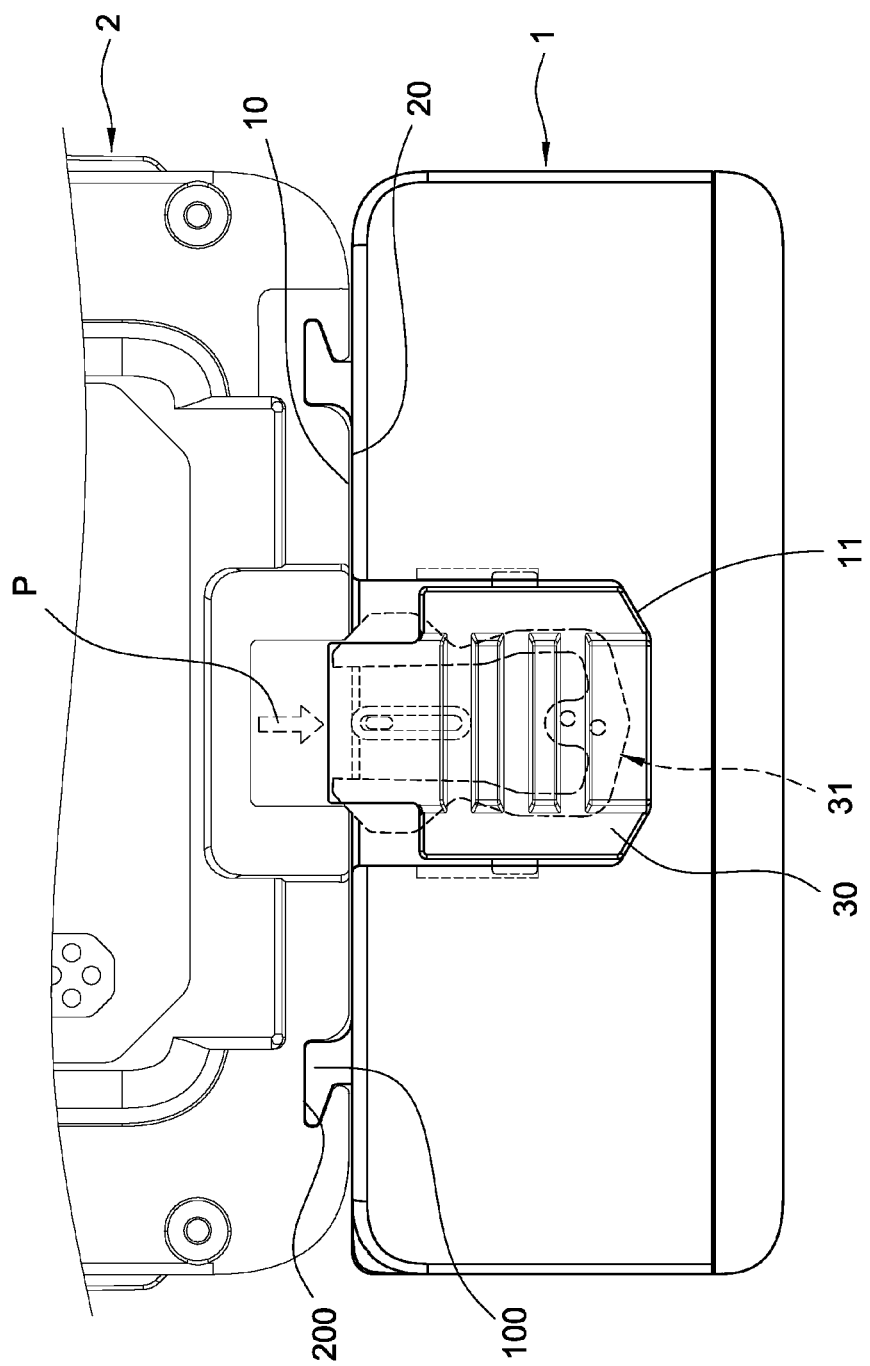
FIG. 7 is a schematic view of how to separate the first and second bodies according to an embodiment of the present disclosure.

Conversely, as shown in FIG. 7, to separate the first and second bodies 1, 2, the slide switch 30 undergoes a backward push P in the direction of force F to trigger the engaging portion 311b of the at least one resilient engaging arm 311 to disengage from the engaging channel 21, thereby separating easily the first and second bodies 1, 2 in the direction opposite to that of the lateral movement M.

If the resilient element 31 is mounted, in a wrong direction, on the slide switch recess 11, the guide surface 311c of the at least one resilient engaging arm 311 will not face the engaging channel 21, and thus the first and second bodies 1, 2 will be joined under no guidance. Therefore, it is important for the resilient element 31 to be mounted on the slide switch recess 11 correctly and precisely. To this end, in an embodiment of the present disclosure, a positioning-related structure is eccentrically positioned between the resilient element 31 and the slide switch recess 11 such that the at least one resilient engaging arm 311 is moved into the slide switch recess 11 while the guide surface 311c is facing the slide switch recess 11. The positioning-related structure includes a plurality of positioning holes 310a and a plurality of positioning posts 11a. The positioning holes 310a are eccentrically disposed on the basal portion 310. The positioning holes 310a are neither aligned nor symmetrically arranged. The positioning posts 11a correspond in position to the positioning holes 310a, respectively. If the resilient element 31 is backwardly moved into the slide switch recess 11, the positioning holes 310a cannot align with the positioning posts 11a, respectively; hence, the resilient element 31 must be rotated from the direction of assembly in order to be mounted on the slide switch recess 11. Likewise, although an embodiment of the present disclosure discloses the positioning holes 310a disposed on the basal portion 310 and the positioning posts 11a disposed in the slide switch recess 11, it is also practicable for the positioning holes 310a and the positioning posts 11a to swap their positions; hence, the present disclosure is not limited thereto.

In conclusion, the demountable assembly structure in an embodiment of the present disclosure achieves its anticipated usage-related objective, that is, joining and separating two objects quickly and conveniently, so as to enhance ease of use.

The present disclosure is disclosed above by preferred, practicable embodiments. However, persons skilled in the art should understand that the preferred embodiments are illustrative of the present disclosure only, but shall not be interpreted as restrictive of the claims of the present disclosure. Hence, all equivalent technical feature changes to the aforesaid embodiments shall fall within the scope of the present disclosure. Accordingly, the legal protection for the present disclosure shall be defined by the appended claims.

What is claimed is:

1. A demountable assembly structure, comprising:
   a first body having a first sliding surface defining a top of the first body and a slide switch recess positioned proximate to the first sliding surface;
   a second body having a second sliding surface defining a bottom of the second body, arranged such that when the second body is stacked on top of the first body with portions of the first sliding surface and the second slide surface in contact, the second sliding surface is slidable relative to the first sliding surface, the second body having an engaging channel positioned proximate to the second sliding surface, the engaging channel being opposite the slide switch recess when the first body and second body are slid to an engaged position;
   and an engaging component comprising a slide switch and a resilient element, the resilient element having a basal portion fixedly disposed in the slide switch recess and two resilient engaging arms extended from the basal portion to the engaging channel, the engaging component moveable in the slide switch recess in a direction of force perpendicular to the first and second sliding surfaces between a first position and a second position;
   a rail disposed on one of the first sliding surface and the second sliding surface, and a groove corresponding in position to the rail disposed on the other of the first sliding surface and the second sliding surface, the rail arranged to be received in the groove with the first sliding surface and the second sliding surface in contact and configured to allow the second body to slide on the first body in a direction toward the engaging component;
   wherein the first body, the second body, the engaging component, and the rail are arranged such that:
   when the engaging component is in the second position, the second body is slidable on the first body such that the two resilient engaging arms come into contact with an outer edge of the engaging channel and are first compressed towards each other by the outer edge of the engaging channel in a direction parallel to the first and second sliding surfaces, and when the two resilient engaging arms pass the outer edge of the engaging channel, the two resilient engaging arms are released and engaged inside the engaging channel such that the second body is in the engaged position; and
   when the second body is in the engaged position, movement of the slide switch to the first position disengages the two resilient engaging arms from the engaging channel, such that the second body is slidable on the first body.

2. The demountable assembly structure of claim 1, wherein a limit recess and a bump which correspond in position to each other are disposed between the slide switch and the slide switch recess, with the limit recess extended in the direction of force, wherein the bump restricts movement of the slide switch to within the slide switch recess and in the direction of force.

3. The demountable assembly structure of claim 2, wherein the limit recess is disposed on the slide switch, and the bump is disposed in the slide switch recess.

4. The demountable assembly structure of claim 1, wherein a guide protrusion is disposed on each of two sides of the slide switch, and two slide slots corresponding in position to the two guide protrusions are disposed in the slide switch recess.

5. The demountable assembly structure of claim 1, wherein each of the two resilient engaging arms has a resilient portion extended from the basal portion and an engaging portion formed at an end of the resilient portion, and the outer edge of the engaging channel comprises an engaging protrusion, and when the first body and second body are in the engaged position, the engaging portions are engaged in the engaging channel by the engaging protrusion.

6. The demountable assembly structure of claim 5, wherein the engaging portion has a guide surface that is facing the engaging protrusion when the second sliding surface of the second body is placed on the first sliding surface of the first body with the engaging channel facing the slide switch recess and before the first body and second body are in the engaged position.

7. The demountable assembly structure of claim 6, wherein a positioning-related structure is disposed between the basal portion and the slide switch recess such that the two resilient engaging arms are movable into the slide switch recess while the guide surface is facing the slide switch recess.

8. The demountable assembly structure of claim 7, wherein the positioning-related structure comprises a plurality of positioning holes and a plurality of positioning posts, the positioning holes being disposed on the basal portion, and the positioning posts being disposed in the slide switch recess.

9. The demountable assembly structure of claim 1, wherein the outer edge of the engaging channel is formed on a surface of the second body perpendicular to the second sliding surface.

10. The demountable assembly structure of claim 9, wherein the two resilient engaging arms extend above the second sliding surface in the first position and are relatively lower in the first position.

11. A demountable assembly structure, comprising:
- a first body having a first sliding surface on a top side thereof and a slide switch recess positioned proximate to the first sliding surface and extending longitudinally along a lateral side thereof;
- a second body having a second sliding surface on a bottom side thereof, arranged such that when the second body is stacked on top of the first body with portions of the first sliding surface and the second slide surface in contact, the second sliding surface is slidable relative to the first sliding surface, the second body further having an engaging channel positioned proximate to the second sliding surface and extending longitudinally along a lateral side thereof, the engaging channel being opposite the slide switch recess when the first body and second body are slid to an engaged position; and
- an engaging component comprising a slide switch and a resilient element, the slide switch disposed in the slide switch recess, the resilient element having a basal portion fixedly disposed in the slide switch recess and two resilient engaging arms extended from the basal portion, the engaging component moveable in the slide switch recess in a direction of force perpendicular to the first and second sliding surfaces between a first position and a second position;

wherein the first body, the second body, and the engaging component are arranged such that:
- when the engaging component is in the second position, the second body is slidable on the first body such that the two resilient engaging arms come into contact with an outer edge of the engaging channel and are first compressed towards each other by the outer edge of the engaging channel in a direction parallel to the first and second sliding surfaces, and when the two resilient engaging arms pass the outer edge of the engaging channel, the two resilient engaging arms are released and engaged inside the engaging channel such that the second body is in the engaged position; and
- when the second body is in the engaged position, movement of the slide switch to the first position disengages the two resilient engaging arms from the engaging channel, such that the second body is slidable on the first body.

12. The demountable assembly structure of claim 11, wherein a limit recess and a bump which correspond in position to each other are disposed between the slide switch and the slide switch recess, with the limit recess extended in the direction of force, wherein the bump restricts movement of the slide switch to within the slide switch recess and in the direction of force.

13. The demountable assembly structure of claim 12, wherein the limit recess is disposed on the slide switch, and the bump is disposed in the slide switch recess.

14. The demountable assembly structure of claim 11, wherein a guide protrusion is disposed on each of two sides of the slide switch, and two slide slots corresponding in position to the two guide protrusions are disposed in the slide switch recess.

15. The demountable assembly structure of claim 11, wherein each of the two resilient engaging arms has a resilient portion extended from the basal portion and an engaging portion formed at an end of the resilient portion, and the outer edge of the engaging channel comprises an engaging protrusion, and when the first body and second body are in the engaged position, the engaging portions are engaged in the engaging channel by the engaging protrusion.

16. The demountable assembly structure of claim 15, wherein the engaging portion has a guide surface that is facing the engaging protrusion when the second sliding surface of the second body is placed on the first sliding surface of the first body with the engaging channel facing the slide switch recess and before the first body and second body are in the engaged position.

17. The demountable assembly structure of claim 16, wherein a positioning-related structure is disposed between the basal portion and the slide switch recess such that the two resilient engaging arms are movable into the slide switch recess while the guide surface is facing the slide switch recess.

18. The demountable assembly structure of claim 17, wherein the positioning-related structure comprises a plurality of positioning holes and a plurality of positioning posts, the positioning holes being disposed on the basal portion, and the positioning posts being disposed in the slide switch recess.

19. The demountable assembly structure of claim 11, wherein the outer edge of the engaging channel is formed on a surface of the second body perpendicular to the second sliding surface.

20. The demountable assembly structure of claim 19, wherein the two resilient engaging arms extend above the second sliding surface in the first position and are relatively lower in the first position.

* * * * *